United States Patent
Shaji Lal et al.

(10) Patent No.: US 10,528,480 B2
(45) Date of Patent: Jan. 7, 2020

(54) APPARATUS AND METHOD FOR EFFICIENT UTILISATION OF AN ADDRESS TRANSLATION CACHE

(71) Applicant: ARM LIMITED, Cambridge (GB)

(72) Inventors: Rakesh Shaji Lal, Austin, TX (US);
Miles Robert Dooley, Austin, TX (US)

(73) Assignee: ARM Limited, Cambridge (GB)

( * ) Notice: Subject to any disclaimer, the term of this patent is extended or adjusted under 35 U.S.C. 154(b) by 140 days.

(21) Appl. No.: 15/685,186

(22) Filed: Aug. 24, 2017

(65) Prior Publication Data
US 2019/0065400 A1    Feb. 28, 2019

(51) Int. Cl.
G06F 12/1045    (2016.01)
G06F 12/02    (2006.01)
G06F 12/1027    (2016.01)

(52) U.S. Cl.
CPC ...... *G06F 12/1054* (2013.01); *G06F 12/0215* (2013.01); *G06F 12/1027* (2013.01);
(Continued)

(58) Field of Classification Search
CPC ............. G06F 12/1054; G06F 12/1027; G06F 12/0215; G06F 12/1063; G06F 2212/652; G06F 2212/1021
See application file for complete search history.

(56) References Cited

U.S. PATENT DOCUMENTS 8,738,860 B1    5/2014 Griffin et al.
2011/0138149 A1    6/2011 Karlsson et al.
(Continued)

OTHER PUBLICATIONS

J. Cortadella et al, "Evaluation of A+B=K Conditions Without Carry Propagation" *IEEE Transactions on Computers*, vol. 41, No. 11, Nov. 1992, pp. 1484-1488.
(Continued)

*Primary Examiner* — David Yi
*Assistant Examiner* — Alan Otto
(74) *Attorney, Agent, or Firm* — Nixon & Vanderhye P.C.

(57) ABSTRACT

An apparatus and method are provided for efficient utilisation of an address translation cache. The apparatus has an address translation cache with a plurality of entries, where each entry stores address translation data used when converting a virtual address into a corresponding physical address of a memory system. Each entry identifies whether the address translation data stored therein is coalesced or non-coalesced address translation data, and also identifies a page size for a page within the memory system that is associated with that address translation data. Control circuitry is responsive to a virtual address, to perform a lookup operation within the address translation cache to produce, for each page size supported by the address translation cache, a hit indication to indicate whether a hit has been detected for an entry storing address translation data of the associated page size. The control circuitry is further arranged to determine, from at least each hit indication for a page size that is able to be associated with coalesced address translation data, a coalesced multi-hit indication which is set when a hit is detected for both an entry containing coalesced address translation data and for an entry containing non-coalesced address translation data. The control circuitry is then arranged, when the lookup operation has completed, to determine whether multiple hits have been detected, and in that instance to reference the coalesced multi-hit indication to determine whether multiple hits have resulted from both coalesced address translation data and non-coalesced address translation data in the address translation cache. This provides an efficient and precise mechanism for distinguishing between multiple hits caused by hardware coalescing and multiple hits caused by software induced issues.

20 Claims, 11 Drawing Sheets

(52) U.S. Cl.
CPC .. *G06F 12/1063* (2013.01); *G06F 2212/1021* (2013.01); *G06F 2212/652* (2013.01)

(56) References Cited

U.S. PATENT DOCUMENTS

2013/0238875 A1\* 9/2013 Ramaraju ........... G06F 12/1027
  711/207
2017/0315927 A1\* 11/2017 Loh .................... G06F 12/1027

OTHER PUBLICATIONS

Extended European Search Report dated Feb. 12, 2019 in EP Application No. 18183528.1, 10 pages.

\* cited by examiner

APPARATUS AND METHOD FOR EFFICIENT UTILISATION OF AN ADDRESS TRANSLATION CACHE

BACKGROUND

The present technique relates to the efficient utilisation of an address translation cache.

It is known to provide data processing systems which incorporate an address translation cache, such as a translation lookaside buffer (TLB), to store address translation data relating to the translation of virtual addresses to physical addresses. The address translation data can also provide attribute data regarding the memory accesses being made, such as permission data and memory attributes. Whilst the provision of an address translation cache is useful in improving performance by reducing the number of slow page table walks required, the address translation cache itself consumes circuit resources.

It is known to create coalesced TLB entries in situations where multiple adjacent descriptors meet page alignment criteria. However, whilst creating coalesced entries can allow more efficient use of the address translation cache resources to be made, it is desirable to efficiently manage the handling of such coalesced entries so as to seek to reduce any performance impact that might otherwise result from the assigning of coalesced address translation data into the address translation cache.

SUMMARY

In one example configuration there is provided an apparatus comprising: an address translation cache having a plurality of entries, each entry to store address translation data used when converting a virtual address into a corresponding physical address of a memory system, each entry being arranged to identify whether the address translation data stored therein is coalesced address translation data or non-coalesced address translation data and to identify a page size for a page within the memory system that is associated with the address translation data; and control circuitry responsive to a virtual address, to perform a lookup operation within the address translation cache to produce, for each page size supported by the address translation cache, a hit indication to indicate whether a hit has been detected for an entry storing address translation data of the associated page size; the control circuitry being arranged to determine, from at least each hit indication for a page size that is able to be associated with coalesced address translation data, a coalesced multi-hit indication which is set when a hit is detected for both an entry containing coalesced address translation data and for an entry containing non-coalesced address translation data; the control circuitry further being arranged to determine, when the lookup operation has completed, whether multiple hits have been detected, and in that instance to reference the coalesced multi-hit indication to determine whether the multiple hits have resulted from both coalesced address translation data and non-coalesced address translation data in the address translation cache.

In another example configuration there is provided a method of managing address translation data within an address translation cache having a plurality of entries, each entry storing address translation data used when converting a virtual address into a corresponding physical address of a memory system, and each entry identifying whether the address translation data stored therein is coalesced address translation data or non-coalesced address translation data and identifying a page size for a page within the memory system that is associated with the address translation data, the method comprising: performing a lookup operation within the address translation cache, in response to a virtual address, to produce, for each page size supported by the address translation cache, a hit indication to indicate whether a hit has been detected for an entry storing address translation data of the associated page size; determining, from at least each hit indication for a page size that is able to be associated with coalesced address translation data, a coalesced multi-hit indication which is set when a hit is detected for both an entry containing coalesced address translation data and for an entry containing non-coalesced address translation data; and determining, when the lookup operation has completed, whether multiple hits have been detected, and in that instance referencing the coalesced multi-hit indication to determine whether the multiple hits have resulted from both coalesced address translation data and non-coalesced address translation data in the address translation cache.

In a still further example configuration there is provided an apparatus comprising: address translation means for providing a plurality of entries, each entry for storing address translation data used when converting a virtual address into a corresponding physical address of a memory system, each entry for identifying whether the address translation data stored therein is coalesced address translation data or non-coalesced address translation data and for identifying a page size for a page within the memory system that is associated with the address translation data; and control means for performing, responsive to a virtual address, a lookup operation within the address translation means to produce, for each page size supported by the address translation means, a hit indication to indicate whether a hit has been detected for an entry storing address translation data of the associated page size; the control means for determining, from at least each hit indication for a page size that is able to be associated with coalesced address translation data, a coalesced multi-hit indication which is set when a hit is detected for both an entry containing coalesced address translation data and for an entry containing non-coalesced address translation data; the control means further for determining, when the lookup operation has completed, whether multiple hits have been detected, and in that instance to reference the coalesced multi-hit indication to determine whether the multiple hits have resulted from both coalesced address translation data and non-coalesced address translation data in the address translation means.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
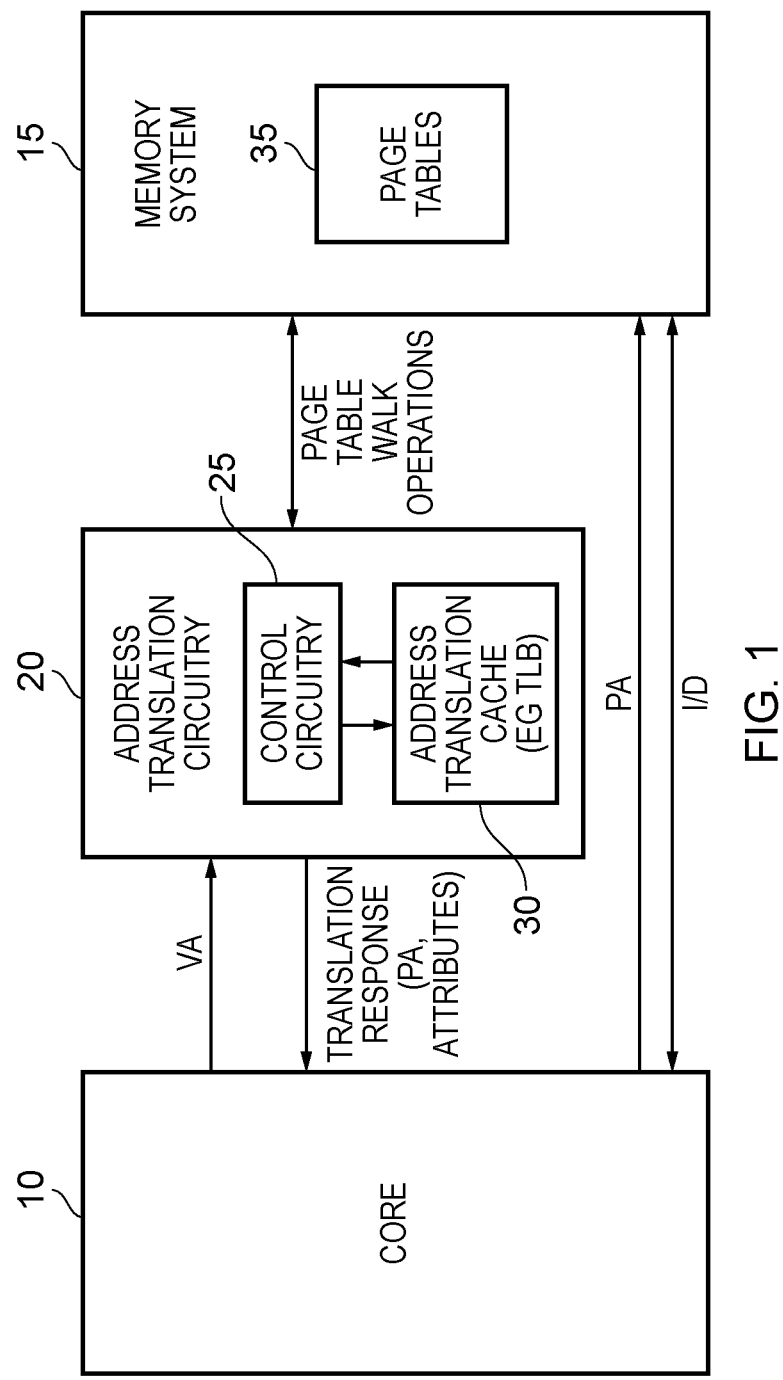
FIG. 1 illustrates a data processing system incorporating an address translation cache in accordance with one embodiment.

Before discussing the embodiments with reference to the accompanying figures, the following description of embodiments is provided.

In one embodiment, an apparatus is provided that comprises an address translation cache having a plurality of entries, where each entry can be used to store address translation data used when converting a virtual address into a corresponding physical address of a memory system. The address translation data can be determined from a descriptor retrieved from a page table during a page table walk process. The descriptor will relate to a particular page size in memory, and as a result the address translation data determined from that descriptor will relate to a particular page size in memory.

By considering a plurality of adjacent descriptors within a page table, it is possible to detect whether page alignment criteria are met that would allow coalesced address translation data to be generated from those descriptors. By selecting the plurality of adjacent descriptors appropriately, the virtual page numbers identified by these descriptors can relate to contiguous pages that are aligned to a larger page size. It can then be determined whether the physical pages assigned to those contiguous virtual pages (as identified by the descriptors) are also contiguous, and if so it may then be possible to create coalesced address translation data from the plurality of adjacent descriptors, that coalesced address translation data then relating to a larger page size. For example, if the information from four adjacent descriptors can be combined in such a manner, then the coalesced address translation data can relate to a physical page size four times larger than the address translation data that would be produced from just a single one of the descriptors. This can provide efficiency savings, since one entry in the address translation cache can be used to store the coalesced address translation data, rather than needing multiple entries to be used to store the separate non-coalesced address translation data.

In accordance with the described embodiment, each entry in the address translation cache can be arranged to identify whether the address translation data stored therein is coalesced address translation data or non-coalesced address translation data, and to identify a page size for a page within the memory system that is associated with the address translation data.

The apparatus then provides control circuitry that is responsive to a virtual address to perform a lookup operation within the address translation cache to produce, for each page size supported by the address translation cache, a hit indication to indicate whether a hit has been detected for an entry storing address translation data of the associated page size. Typically, it is expected that at most there will only be a single entry that hits within the address translation cache for any provided virtual address, as the presence of multiple hits would indicate a software-induced multiple hit due to badly mapped translations consisting of overlapping pages. However, at the time of deciding to allocate coalesced address translation data into the address translation cache, it may be that the address translation cache already stores a non-coalesced version of the address translation data relating to one or more of the pages that have been coalesced. Whilst at the time of allocation an additional lookup could be performed to detect such a situation, and to remove any such non-coalesced version, this could have a significant performance impact, since whilst a lookup is being performed for that purpose it may not be possible to perform a lookup for a new virtual address provided by the associated processing circuitry. Further, such an approach may involve adding a new lookup port to the address translation cache which could substantially increase power consumption, both static and dynamic.

Accordingly, in the embodiments described herein the address translation cache is allowed to allocate coalesced address translation data into one of its entries without, at that time, performing any check to determine whether there are any entries storing non-coalesced address translation data for one or more of the pages that have been coalesced. As a result, it is possible that, in a situation where multiple hits are detected, whilst this could still be due to a software-induced problem, it might alternatively be due to the legitimate use of coalesced address translation data. In the described embodiments, a mechanism is provided for efficiently and reliably distinguishing between these two different sources of multiple hits.

In particular, the control circuitry is arranged to determine, from at least each hit indication for a page size that is able to be associated with coalesced address translation data, a coalesced multi-hit indication which is set when a hit is detected for both an entry containing coalesced address translation data and for an entry containing non-coalesced address translation data. In many situations, it has been found that this coalesced multi-hit indication can be produced without needing to wait for the lookup operation to complete. The logic value associated with the set state can vary dependent on embodiment, but in one embodiment is a logic 1 value.

The control circuitry is then further arranged to determine, when the lookup operation has completed, whether multiple hits have been detected, and in that instance it then references the coalesced multi-hit indication to determine whether the multiple hits have resulted from both coalesced address translation data and non-coalesced address translation data in the address translation cache. This enables the action taken as a result of detecting multiple hits to be tailored to take into account whether the reason for the multiple hits is a software-induced issue, which may for example require an exception to be taken, or a hardware-induced multi-hit situation due to the use of coalesced address translation data, which can readily be resolved without needing to take an exception.

In one embodiment, the page sizes supported by the address translation cache include one or more page sizes unable to be associated with coalesced address translation data, and the control circuitry may be arranged to determine the coalesced multi-hit indication from a subset of the hit indications without awaiting generation during the lookup operation of at least one remaining hit indication outside said subset, where each remaining hit indication relates to a page size unable to be associated with coalesced address translation data. In particular, it is often the case that the mechanism used to perform the lookup operation in order to produce a hit indication for each possible page size is such that the time at which the individual hit indications become available is dependent on the page size. Since only a subset of the hit indications need to be used by the control circuitry to generate the coalesced multi-hit indication, it is possible for the control circuitry to initiate the generation of that coalesced multi-hit indication without needing to wait for all the hit indications being produced by the lookup operation to become available. In many embodiments, it has been found that this enables the coalesced multi-hit indication to be available by the time the lookup operation has been completed, and hence for that coalesced multi-hit indication to be immediately available to the control circuitry if the control circuitry does determine, after the lookup operation has completed, that multiple hits have occurred.

The subset of hit indications used by the control circuitry to generate the coalesced multi-hit indication may vary dependent on embodiment, but in one embodiment that subset of hit indications comprises each hit indication for a page size that is able to be associated with coalesced address translation data, and at least one hit indication for a page size smaller than any page size that is able to be associated with coalesced address translation data. In particular, at least the smallest page size supported by the address translation cache may often be a page size that is not able to be associated with coalesced address translation data, since the smallest page size associated with coalesced address translation data will be a multiple of that smaller supported page size. In such instances, any such page size that is smaller than a page size associated with coalesced address translation data, but which relates to a page size that could be coalesced into a larger page size by the generation of coalesced address translation data, will in one embodiment be reviewed by the control circuitry when generating the coalesced multi-hit indication.

In one embodiment, the remaining hit indications relate to page sizes larger than any page size that is able to be associated with coalesced address translation data. When performing the lookup operation, it may be the case that the hit indications produced for larger page sizes take longer to generate than the hit indications produced for smaller page sizes, and accordingly in that scenario, when the supported page sizes include one or more page sizes that are larger than any page size that may be associated with coalesced address translation data, this enables the control circuitry to initiate generation of the coalesced multi-hit indication without waiting for the hit indications for those larger page sizes to be produced during the lookup operation.

There are a number of techniques that can be used by the control circuitry to perform the lookup operation, but in one embodiment the control circuitry comprises Sum-Addressed-Compare circuitry to perform the lookup operation, such that each hit indication becomes available at a timing that is dependent on the page size associated with that hit indication. It is often the case that the computed virtual address is computed by adding together two source values. However, rather than adding those two source values together to produce the virtual address, and then comparing that computed virtual address with the corresponding virtual address in each entry of the address translation cache, the Sum-Addressed-Compare approach provides for a quicker detection of matching virtual addresses, without needing the full carry propagation of the adder that adds together the two source values to produce the virtual address. Instead, an assumption is made that the calculated virtual address is the same as the virtual address stored in the entry of the address translation cache, and then information about the required carry-in and carry-out values for each bit can be determined if the comparison is to be correct. It is then only necessary to compare the carry-in of one bit with the carry-out of the bit below in order to detect if there is a match. More details of a suitable Sum-Addressed-Compare mechanism is described in the paper "Evaluation of A+B=K Conditions Without Carry Propagation" by J Cortadella et al, IEEE Transactions on Computers, Volume 41, Number 11, November 1992, Pages 1484 to 1488.

When adopting the Sum-Addressed-Compare mechanism to perform the lookup operation, the hit indications for smaller page sizes can be produced earlier than the hit indications for larger page sizes, and hence when there is at least one page size larger than any page size that is able to be associated with coalesced address translation data, this means that the control circuitry can initiate generation of the coalesced multi-hit indication before the lookup operation has completed.

The hit indications can take a variety of forms but in one embodiment each hit indication comprises a hit vector identifying on an entry by entry basis whether a hit has been detected for address translation data of the associated page size.

In one such embodiment the control circuitry may be arranged to determine the coalesced multi-hit indication by generating a coalesced hit vector by logically combining the hit vectors of each hit indication for a page size that is able to be associated with coalesced address translation data, qualified by information identifying which entries contain coalesced address translation data, and generating a non-coalesced hit vector by logically combining the hit vectors of each hit indication for a page size that is able to be associated with coalesced address translation data, qualified by information identifying which entries contain non-coalesced address translation data, in order to produce an output vector from which the non-coalesced hit vector is derived. A reduction and combining operation is then performed on the coalesced hit vector and non-coalesced hit vector to generate the coalesced multi-hit indication.

Such an approach provides a precise mechanism for detecting duplicate entries due to hardware coalescing, enabling clear demarcation of hardware coalescing induced multiple hits from software induced multiple hits that are due to badly mapped translations consisting of overlapping pages. By such an approach, any multiple hit among two or more non-coalesced pages will not cause the coalesced multi-hit indication to be set. Similarly if there are multiple hits among two or more coalesced pages, this will not cause the coalesced multi-hit indication to be set. In one embodiment, this is the required behaviour since coalesced address translation data is restricted to be generated from non-coalesced address translation data. Accordingly multiple levels of coalescing are prohibited, and as a result any multiple hit between two coalesced entries would be indicative of a software-induced issue.

The manner in which the non-coalesced hit vector is produced from the output vector can vary depending on embodiment, but in one embodiment the control circuitry is arranged to generate the non-coalesced hit vector by logically combining the output vector with the hit vector of at least one hit indication associated with a page size smaller than any page size that is able to be associated with coalesced address translation data.

There are a number of ways in which the information identifying which entries contain coalesced address translation data can be provided. However, in one embodiment that information comprises a coalesced entry vector identifying on an entry by entry basis whether that entry stores coalesced address translation data.

In one such embodiment, the control circuitry may be arranged to generate the coalesced hit vector by performing an OR operation using as inputs the hit vectors of each hit indication for a page size that is able to be associated with coalesced address translation data, in order to produce a partial result vector, and then performing an AND operation using as inputs the partial result vector and the coalesced entry vector, in order to produce the coalesced hit vector. This provides a simple and efficient mechanism for producing the coalesced hit vector.

Similarly, in one embodiment the control circuitry may be arranged to generate the non-coalesced hit vector by performing an OR operation using as inputs the hit vectors of each hit indication for a page size that is able to be associated with coalesced address translation data, in order to produce a partial result vector, and then performing an AND operation using as inputs the partial result vector and an inverted version of the coalesced entry vector, in order to produce the output vector from which the non-coalesced hit vector is derived. Again, this provides a simple and efficient mechanism for generating the non-coalesced hit vector.

There are a number of ways in which the reduction and combining operation may be performed. However, in one embodiment the control circuitry is arranged to perform the reduction and combining operation by OR-reducing the coalesced hit vector to produce a first intermediate result, OR-reducing the non-coalesced hit vector to produce a second intermediate result, and then performing an AND operation using as inputs the first and second intermediate results, in order to generate the coalesced multi-hit indication. This provides a particularly simple and efficient mechanism for generating the coalesced multi-hit indication.

As mentioned earlier, once the coalesced multi-hit indication has been generated, it can be referenced by the control circuitry if the control circuitry then determines, after the lookup operation has completed, that multiple hits have been detected. In particular, in one embodiment the control circuitry is arranged, when it is determined that multiple hits have been detected by the lookup operation and the coalesced multi-hit indication is unset, to issue a signal indicating that a software induced multi-hit event has occurred. In particular, if the coalesced multi-hit indication is unset, this indicates that any occurrence of multiple hits is not due to hardware coalescing, and accordingly should be treated as a software induced issue. The signal issued by the control circuitry in this instance can take a variety of forms, but in one embodiment is an abort signal. In such an embodiment, when the abort signal is driven, the processor core will flush the contents of the pipeline and redirect execution to an abort handler. The abort handler is a piece of software written by a programmer, for example an operating system developer, which is arranged to take the necessary steps to rectify the condition causing the abort. In the present case, such steps will involve correcting the page tables in memory, such that a multi-hit will not occur in the future.

In contrast, in one embodiment, the control circuitry may be arranged, when it is determined that multiple hits have been detected by the lookup operation and the coalesced multi-hit indication is set, to issue a retry request to a source that provided the virtual address, and to initiate a cleanup operation to invalidate at least one entry in the address translation cache, such that when the source reissues the virtual address, a hit will then be detected in only one entry of the address translation cache. In one example, the source will be an associated processor core that issues the virtual address to trigger performance of the lookup operation. In the presence of a hardware-induced multiple hit being detected, due to the use of coalesced address translation data, the control circuitry can be arranged to reject the request from the source rather than generating any hit indication, so as to cause the source to retry the request. It has typically been found that by the time the source is in a position to retry the request, the required clean-up operation can be completed, so that when the request is reissued, a hit will only be detected in one entry of the address translation cache. Hence, this can provide a significantly higher performance and energy efficient solution than seeking to resolve the potential for hardware induced multiple hits at the time coalesced address translation data is allocated into the address translation cache.

The clean-up operation can take a variety of forms but in one embodiment causes invalidation of at least an entry storing non-coalesced address translation data that resulted in a hit during the lookup operation.

In an alternative approach, the cleanup operation comprises invalidation of each entry that resulted in a hit during the lookup operation, and issuance of a request to a memory management unit to cause coalesced address translation data to be provided for allocating into an entry of the address translation cache. In some embodiments, it can be simpler to merely invalidate each of the entries that resulted in a hit rather than detecting which entry related to the non-coalesced address translation data and only invalidating that entry. Further, it has been found that the memory management unit can typically respond to the request by providing the required coalesced address translation data in a time period that enables that data to be allocated into an entry of the address translation cache before the source is in a position to retry the access request, hence making this a performant solution.

The coalesced address translation data to be allocated into the address translation cache can be generated in a variety of ways. However, in one embodiment the apparatus comprises coalescing circuitry to generate, for storage in the address translation cache, said coalesced address translation data from multiple page table descriptors, the coalesced address translation data relating to a page size which is a multiple of the page size associated with each of the page table descriptors and which is one of the pages sizes supported by the address translation cache.

The address translation cache can take a variety of forms. For example, it could be a walk cache storing partial address translation data rather than full translation data required to compute the physical address from the virtual address. However, in one embodiment the address translation cache is a translation lookaside buffer (TLB) used to store full address translation data to enable a virtual address to be converted into a corresponding physical address.

Further, the address translation cache can be organised in a variety of ways. For example, in one embodiment it may be organised as a set associative structure. However, in one particular embodiment the address translation cache is a fully associative cache. In such an embodiment, the hit vectors produced during the lookup operation may include a hit/miss indication for every entry in the fully associative cache.

Particular embodiments will now be described with reference to the Figures.

FIG. 1 schematically illustrates a data processing system including a processor core 10 for executing program instructions and for performing data accesses (both instruction fetches and accesses to data to be manipulated) using virtual addresses VA. These virtual addresses are subject to address translation to physical addresses PA by address translation circuitry 20. The physical addresses are used to control access to instructions and data in a memory system 15. The memory system 15 may comprise a memory hierarchy, such as multiple levels of cache memory and a main memory or other non-volatile storage.

As shown in FIG. 1, the address translation circuitry 20 includes an address translation cache 30, which in one example may take the form of a translation lookaside buffer (TLB). The address translation cache 30 has a plurality of entries, where each entry stores address translation data used when converting a virtual address into a corresponding physical address of a memory system. The address translation data is determined by performing page table walk operations in respect of page tables 35 stored within the memory system 15. As will be discussed later with reference to FIG. 3, a multi-level page table walk process may be used in order to obtain, with reference to a final level descriptor, full address translation data enabling a virtual address to be converted into a physical address, and that full address translation data may be stored within the address translation cache 30. Taking the example where the address translation cache is a TLB, a TLB is usually used to store such full address translation data. In one embodiment, the techniques described herein allow coalesced address translation data to be generated specifying full address translation data obtained with reference to multiple such final level descriptors, with that coalesced address translation data then being stored in an entry of the TLB.

As shown schematically in FIG. 1, when the core 10 issues a virtual address to the address translation circuitry 20, the control circuitry 25 can perform a lookup operation within the address translation cache 30 to determine whether a hit is detected within one of the entries of the address translation cache. If the address translation cache is arranged in a fully associative manner, all of the entries may be considered during the lookup operation. However, if the address translation cache has a set associative structure, then certain bits of the virtual address will be used as an index into the address translation cache in order to identify a set, and the entries within that set will be reviewed in order to determine whether a hit is detected. If a hit is detected, then a table walk response can be returned directly to the processor core 10, this including physical address bits and associated attributes stored within the hit entry within the address translation cache. Based on this information, the core can then generate a physical address to output to the memory system 15 in order to access a required instruction, or data to be manipulated. If a hit is not detected within the address translation cache, the address translation circuitry 20 will initiate a page table walk process in order to access the relevant page tables 35 within the memory system in order to walk through a sequence of descriptors until a final level descriptor is obtained, at which point full address translation data can be determined and an appropriate table walk response can then be returned to the core. During this process, one or more entries within the address translation cache 30 can be allocated to store address translation data derived from the accessed descriptors. This is likely to enable a subsequently issued virtual address to result in a hit within the address translation cache, thereby reducing access times.

Figure 2:
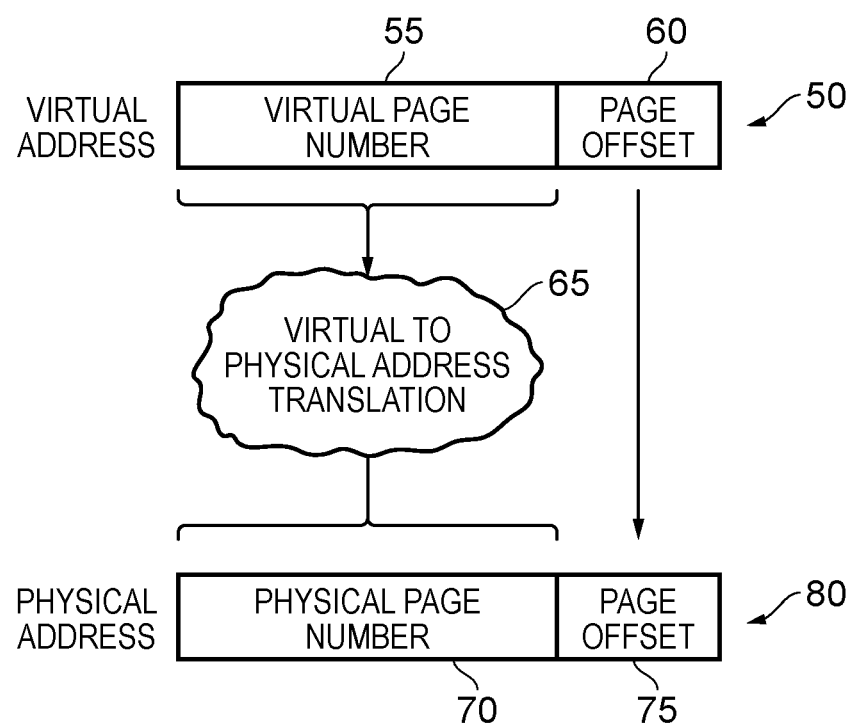
FIG. 2 is a diagram schematically illustrating a virtual to physical address translation process.

FIG. 2 is a diagram schematically illustrating the address translation process. A virtual address 50 can be considered to comprise a number of bits 55 identifying a virtual page number, and some other bits 60 identifying a page offset. The number of bits forming the virtual page number and the number of bits forming the page offset will depend on the page size. The address translation operation performed by the address translation circuitry 20 is illustrated schematically by the element 65 shown in FIG. 2, and serves to obtain address translation information sufficient to enable the virtual page number bits 55 to be translated into equivalent bits 70 of a physical address 80 identifying a physical page number. The page offset bits are not altered, and accordingly the page offset bits 75 are directly determined from the page offset bit 60 in the virtual address.

Figure 3:
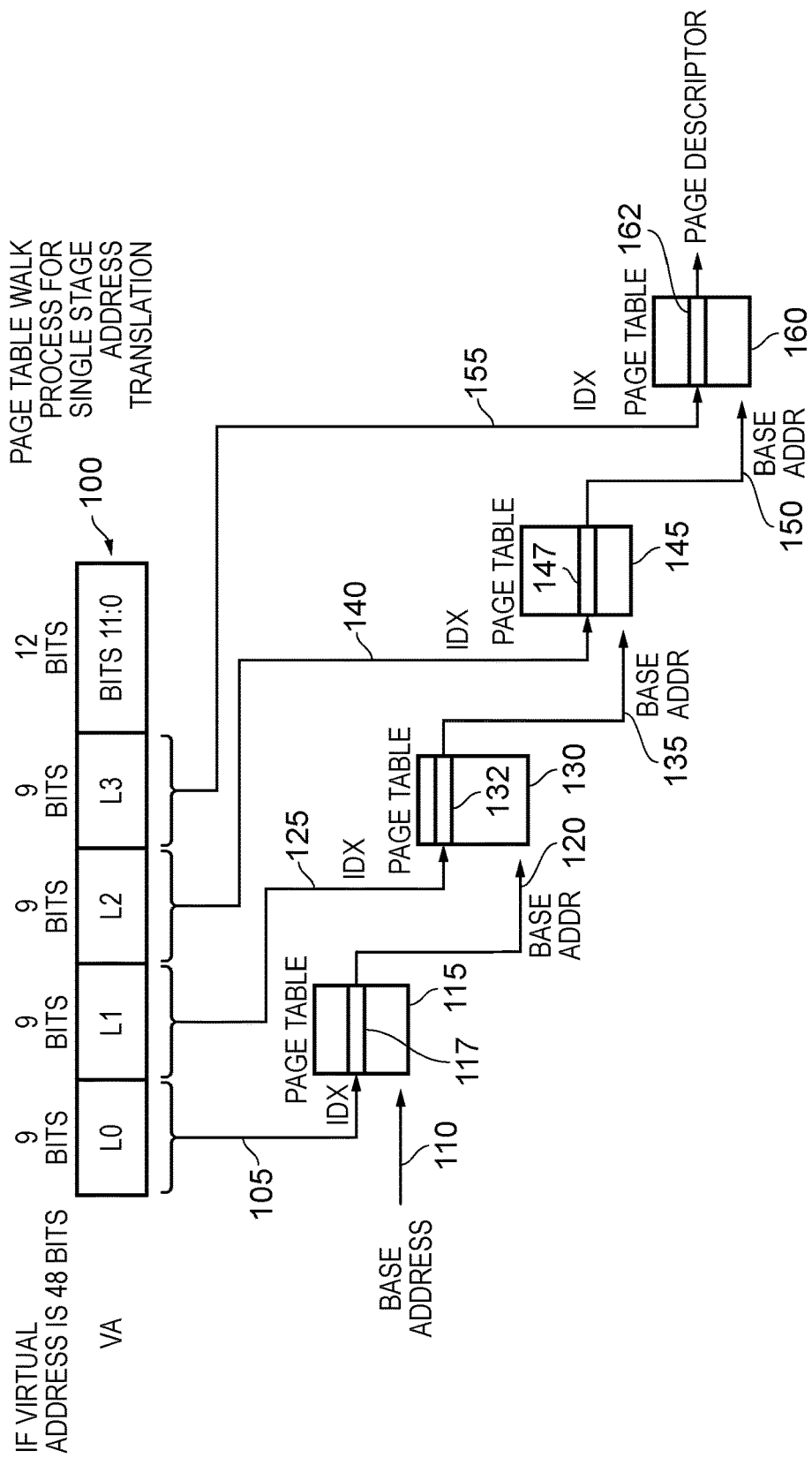
FIG. 3 schematically illustrates a multi-level page table walk which includes a single stage address translation process.

FIG. 3 is a diagram schematically illustrating the page table walk operation assuming there is a single stage address translation mechanism being used. In this example, it is assumed that the virtual address is 48 bits (labelled bits 0 to 47), and hence the virtual address 100 has a series of 9 bit portions associated with different levels of the page table walk process, with the 12 least significant bits denoting page offset.

At the start of the page table walk process, a base register is accessed to identify a base address 110 that is used to identify the page table 115. The 9 bits 105 associated with level zero of the page table walk process are used to identify an index into that page table 115, and hence identify an intermediate level descriptor 117. This intermediate level descriptor 117 provides a base address 120 that is used to identify a further page table 130, with the level one virtual address bits 125 being used to identify an index into that table. This identifies the intermediate level descriptor 132 that provides a further base address 135 to identify the page table 145. The level 2 virtual address bits 140 are then used to provide an index into that table 145 in order to identify the intermediate level descriptor 147, which then provides the base address 150 that identifies a final page table 160. The level 3 virtual address bits 155 then provide an index into that table 160, identifying a final level descriptor 162 also referred to as a page descriptor. With the information provided by the page descriptor, it is then possible to generate address translation data for storing in one of the entries of the TLB 30 enabling the virtual page number 55 to be converted into a physical page number 70 and hence allowing the required page in memory to be identified. This then enables the particular item of data (or instruction) corresponding to the virtual address to be accessed by the core 10 issuing the required physical address to the memory system 15.

It should be noted that in some embodiments final level descriptors can be specified at an earlier level in the page table walk process. For example, the descriptor 147 can have a block field which, when set, indicates that that descriptor is a block descriptor, which is a type of final level descriptor, rather than being an intermediate level descriptor. Hence, the information within the descriptor 147 can be used to produce the full address translation data.

Figure 4:
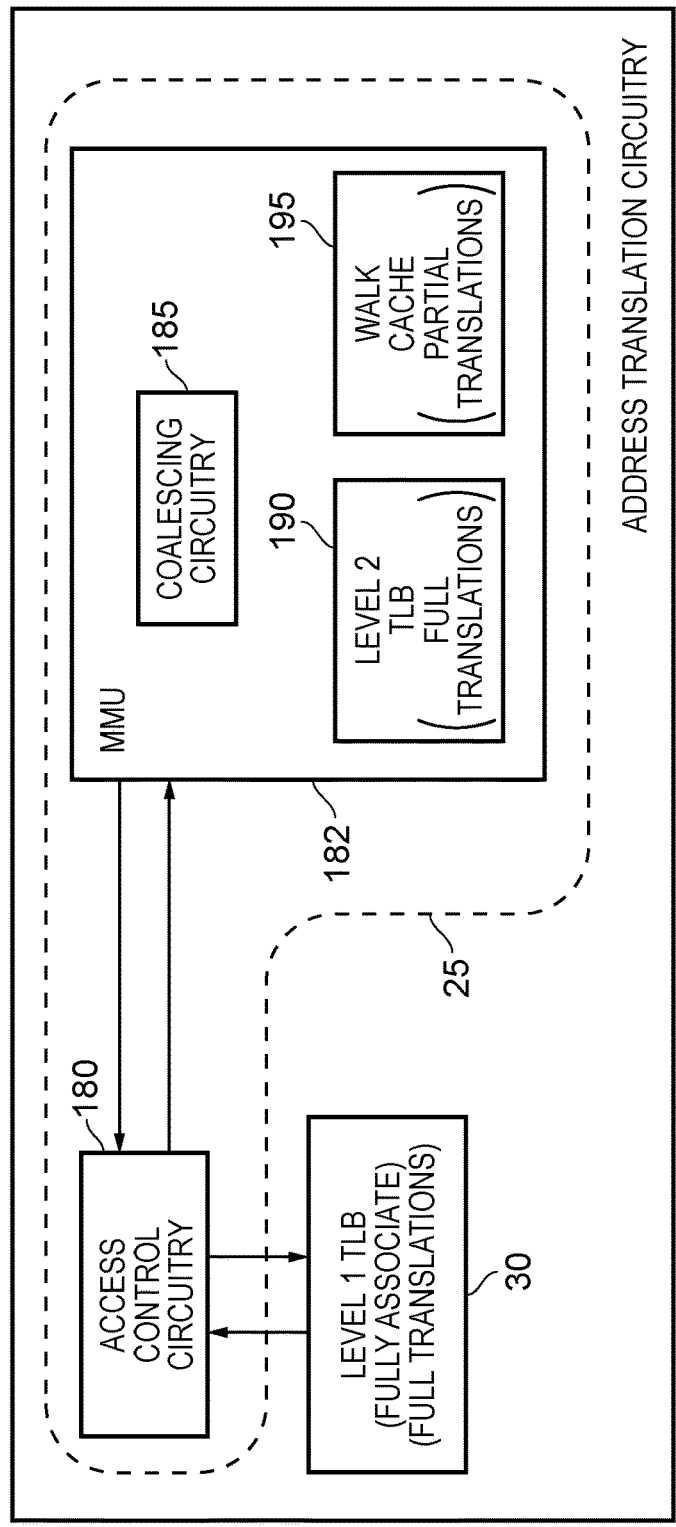
FIG. 4 is a block diagram illustrating in more detail the address translation circuitry of FIG. 1 in accordance with one embodiment.

FIG. 4 is a block diagram illustrating in more detail components provided within the address translation circuitry 20 of FIG. 1 in accordance with one embodiment. In this embodiment, the address translation cache 30 takes the form of a level 1 TLB. In particular, in one embodiment this level 1 TLB is a data TLB for providing address translation data used when converting a virtual address for a data value to be fetched from memory into a corresponding physical address. In one embodiment, a separate level 1 instruction TLB may be provided for storing address translation data used when converting a virtual address of an instruction into a corresponding physical address identifying a location in memory from which to retrieve that instruction. For ease of illustration, a separate level 1 instruction TLB is not shown in FIG. 4.

In this embodiment, the control circuitry 25 shown in FIG. 1 actually comprises access control circuitry 180 associated with the level 1 TLB 30 and a memory management unit 182. The access control circuitry 180 is arranged to receive virtual address information, and perform lookup operations within the level 1 TLB to determine whether the specified virtual address hits on any of the entries in the TLB. The access control circuitry 180 is also arranged to perform allocation of new address translation data into an entry of the TLB when such address translation data is provided by the MMU 182. As necessary, the access control circuitry 180 can also perform an eviction process in order to identify a victim entry within the level 1 TLB 30 into which to allocate new address translation data provided by the MMU. In one embodiment, it will not in fact be necessary to evict the current contents of an entry when that entry's contents are overwritten with new address translation data, since that data can always be recreated by the MMU.

As shown in FIG. 4, the MMU 182 can include a level 2 TLB 190 (which is typically larger than the level 1 TLB 30) to store address translation data that has been obtained via page table walks performed by the MMU 182. This enables that address translation data to be readily available to provide to the level 1 TLB as and when required. As mentioned earlier, TLBs typically store the full address translation data, but as will be apparent from the earlier discussion of FIG. 3 partial address translation data will also be obtained by one or more of the earlier levels of the page table walk process. Such partial address translation data can be stored within a walk cache 195 within the MMU 182 in one embodiment.

As also shown in FIG. 4, the MMU 182 may include coalescing circuitry 185 which is arranged to detect situations where the data obtained from multiple adjacent descriptors in a page table can be merged to create coalesced address translation data for a larger page. In particular, it is observed that many operating system memory allocation mechanisms naturally assign contiguous physical pages to contiguous virtual pages. The coalescing circuitry 185 can be arranged under certain situations to analyse a plurality of adjacent descriptors from a page table that are chosen to be descriptors associated with contiguous virtual pages, where the corresponding virtual pages associated with the descriptors are aligned to a larger page size. These descriptors are hence associated with candidate contiguous virtual pages that may have corresponding contiguous physical pages assigned to them. The coalescing circuitry 185 can then determine whether the physical address information provided in each of those descriptors indicates that the corresponding physical pages are indeed contiguous physical pages, and under that situation may be arranged to generate coalesced address translation data to represent an effective larger physical page formed by those contiguous physical pages. When such coalesced address translation data is created, a request can be sent to the access control circuitry 180 to cause that coalesced address translation data to be allocated into an entry of the level 1 TLB 30. In addition, if desired, that coalesced address translation data may also be stored within an entry of the level 2 TLB 190. Whilst in principle such coalescing techniques could also be applied in respect of partial address translation data such as may be stored within the walk cache 195, for the purposes of the following description it will be assumed that such coalescing is only performed in respect of full address translation data obtained with reference to a plurality of adjacent final level descriptors within a page table.

Figure 5:
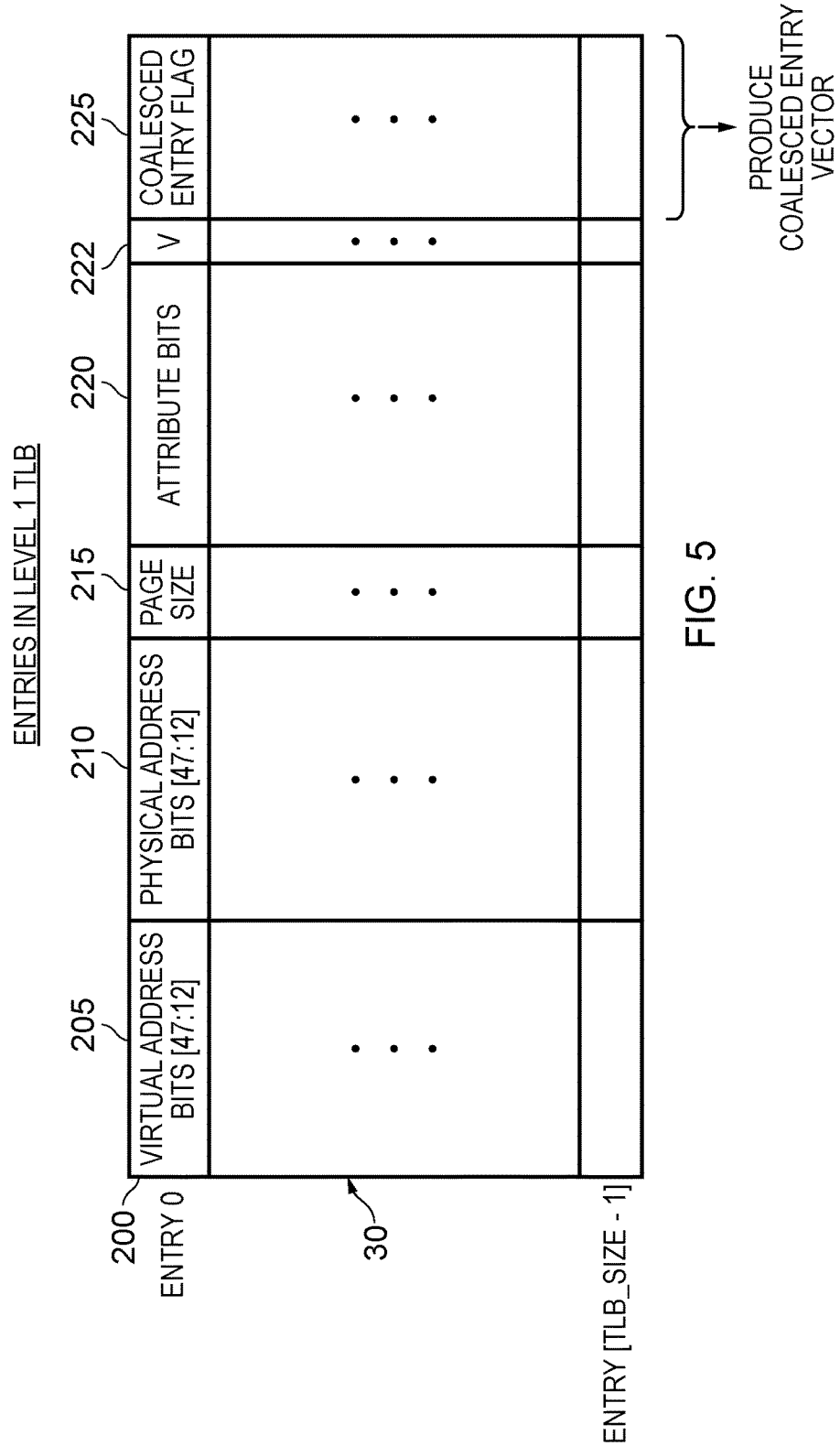
FIG. 5 illustrates the fields that may be provided within each entry of the level 1 TLB shown in FIG. 4 in accordance with one embodiment.

FIG. 5 is a diagram schematically illustrating the fields that may be provided within each entry of the address translation cache 30 in accordance with one embodiment. As shown, an entry 200 may include a virtual address portion 205 containing a certain number of the virtual address bits. The number of bits stored in this field will be dependant on embodiment, but assuming the earlier example of FIG. 3 where the most significant 36 bits of a 48-bit virtual address are used during the multi-level page table walk process, bits 47 to 12 may be stored within the virtual address field 205. The corresponding physical address field 210 is used to store corresponding physical address bits.

In one embodiment, a page size field 215 is provided to indicate a page size of a page within the memory system that is associated with the address translation data stored in that entry. The field 220 is used to store other attribute data associated with the address translation data. These attributes can take a variety of forms, and may for example include access permissions, and memory type information, such as whether the associated page relates to a writeback region of memory, a non-cacheable region, etc. A further field 222 may be used to store a valid bit to identify if the entry stores valid information. In one embodiment, a coalesced entry flag field 225 is also provided to identify whether the address translation data in the entry is coalesced address translation data or non-coalesced address translation data. As will be discussed in more detail later with reference to FIG. 7, when a lookup operation is performed within the address translation cache 30, the information in the coalesced entry flag field 225 for the various entries within the address translation cache can be output to produce a coalesced entry vector identifying on an entry-by-entry basis which entries store coalesced address translation data and which entries do not store coalesced address translation data.

Figure 6:
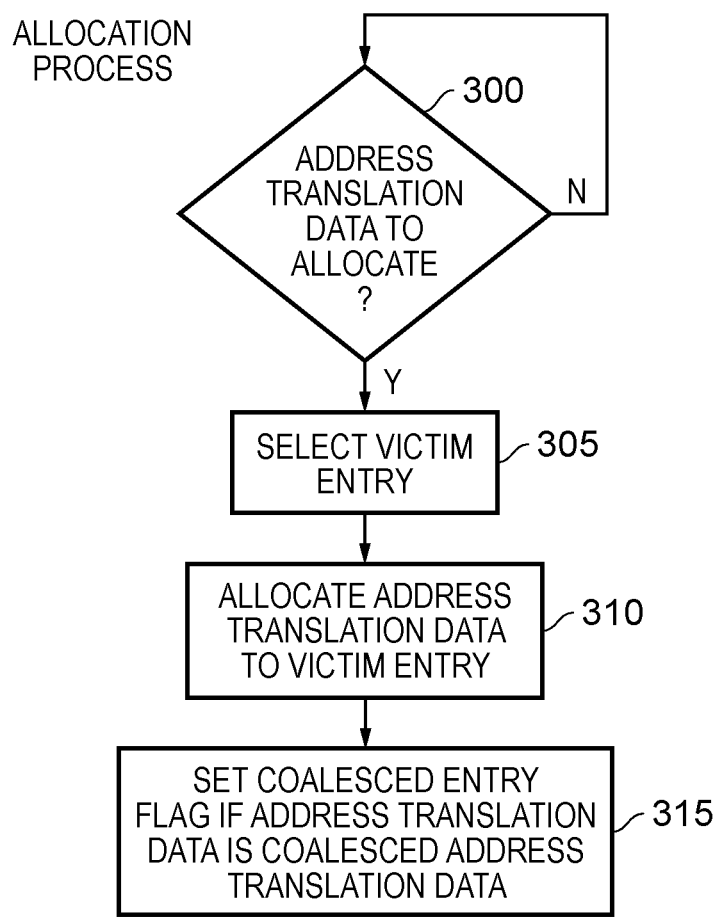
FIG. 6 is a flow diagram illustrating the steps taken to allocate address translation data into an entry of the level 1 TLB in accordance with one embodiment.

FIG. 6 is a flow diagram illustrating the allocation process performed by the access control circuitry 180 when provided with new address translation data from the MMU 182. At step 300, it is determined whether there is new address translation data to allocate and, when there is, a victim selection policy is applied by the access control circuitry 180 at step 305 to select a victim entry whose contents are to be overwritten with the new address translation data. Thereafter, a step 310 that new address translation data is allocated into the victim entry with the contents being marked as valid. Further, at step 315, the coalesced entry flag for that entry is set (e.g. to a logic 1 value) if the address translation data is coalesced address translation data and is cleared (e.g. to a logic 0 value) if instead the address translation data is non-coalesced address translation data. This then completes the allocation process. In particular, it should be noted that no check is made to determine whether any of the other remaining entries within the address translation cache 30 contain address translation data for one of the physical pages that has been represented within the coalesced address translation data. This means that there is a potential later for multiple hits to be detected when a lookup operation is performed for certain virtual addresses.

Typically, any such multiple hit would be viewed as a software-induced problem due to badly mapped translations consisting of overlapping pages, and may for instance result in the issuance of an abort signal. However, in accordance with the embodiments described herein, it is possible during a lookup process to distinguish between such software-induced multiple hit problems, and a legitimate hardware induced multiple hit due to the allocation of coalesced address translation data into the address translation cache.

Further, having provided a reliable mechanism to distinguish between these two different reasons for multiple hits, it is then possible to address the hardware induced multiple hit issue in an efficient way, and in particular in a manner that is significantly more efficient than seeking to determine whether there are any relevant non-coalesced entries within the TLB at the time coalesced address translation data is allocated into the TLB. In particular, if a lookup within the TLB for conflicting entries were to be performed each time coalesced address translation data was allocated into the address translation cache, this could result in a wasted cycle of useful instruction stream lookup in situations when the core is requesting a lookup for a new virtual address at a time that coincides with the allocation of coalesced address translation data into the TLB. Moreover, to provide for such a conflicting entry lookup, it may be necessary to add a new lookup port to the TLB, which can lead to a substantial increase in both static and dynamic power. These issues are avoided by the techniques described herein.

As an example of how duplicate translation entries can occur within the address translation cache when coalescing is used, consider the following example. Let it be assumed that three adjacent 4 KB pages were accessed by the instruction stream executing on the processor core, those accesses resulting in three entries in the TLB 30 being allocated to store associated address translation data. Then it is assumed that a fourth adjacent 4 KB page access misses in the level 1 TLB, resulting in a request being issued to the MMU 182 for the address translation data. The MMU may decide that is possible to coalesce the four 4 KB pages into one coalesced 16 KB page, with that coalesced address translation data being sent back to the level 1 TLB 30 for allocation as a coalesced 16 KB page. Accordingly, when this 16 KB page is installed into the level 1 TLB 30 using the process of FIG. 6, there may still be three sets of duplicate entries, where each set consists of one of the original three 4 KB pages and the coalesced 16 KB page. Whilst the processor core continues to issue virtual addresses that relate to the fourth 4 KB page, there will be no multiple hits detected, but if a virtual address is issued that relates to any of the first three 4 KB pages then this will result in a multiple hit being detected. The following figures describe how such multiple hits are distinguished from software-induced multiple hits in accordance with the described embodiments, and what steps are taken in response to detection of such multiple hit conditions.

Figure 7:
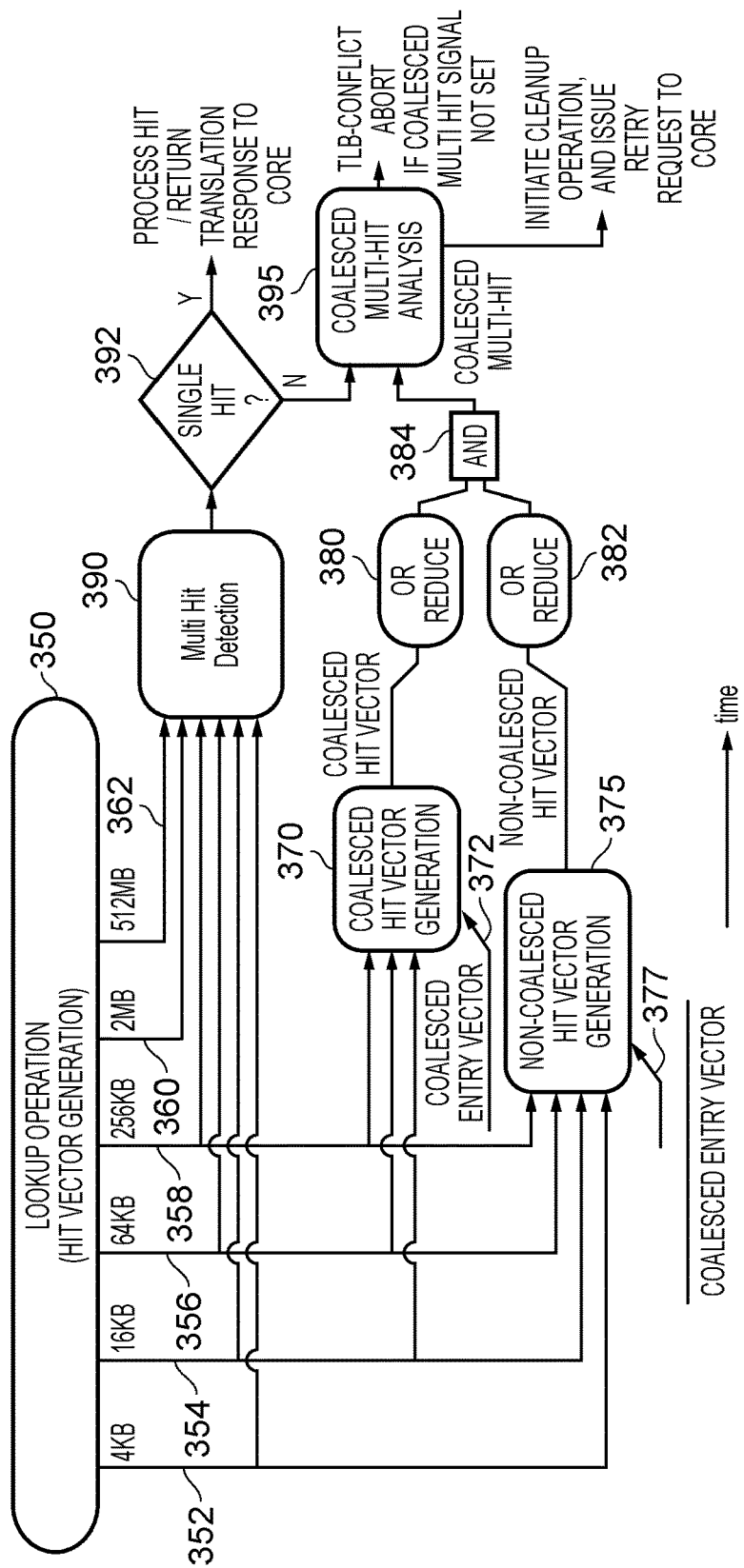
FIG. 7 is a diagram schematically illustrating the operations performed with reference to the level 1 TLB upon receipt of a virtual address from the processor core, in accordance with one embodiment.

FIG. 7 is a diagram schematically illustrating the various processes performed by the access control circuitry 180 upon receipt of a new virtual address from the processor core, and in particular illustrates the relative timing of the various processes. As shown in FIG. 7 a lookup operation 350 is performed in order to produce, for each page size supported by the address translation cache, a hit vector indicating on an entry-by-entry basis whether a hit has been detected for address translation data of the associated page size. In the example illustrated in FIG. 7, it is assumed that the address translation cache supports 6 page sizes, namely 4 KB, 16 KB, 64 KB, 256 KB, 2 MB and 512 MB. It will be appreciated that the number of virtual address bits that need to be compared with corresponding virtual address bits in the TLB entries will differ depending on the assumption made about the page size. For example, assuming that the virtual address is a 48-bit virtual address as for example discussed earlier with reference to FIG. 3 (and assuming the bits are labelled bits 0 to 47), then it will be necessary to compare bits 47 to 12 inclusive if the page size is 4 KB, bits 47 to 14 inclusive if the page size is 16 KB, bits 47 to 16 inclusive if the page size is 64 KB, bits 47 to 18 inclusive if the page size is 256 KB, bits 47 to 21 inclusive if the page size is 2 MB and bits 47 to 29 inclusive if the page size is 512 MB.

There are a number of different mechanisms that can be performed to implement the lookup operation, but due to the different number of compare bits it will typically be the case that the hit vectors will become available at different points in time, as illustrated in FIG. 7. In one particular embodiment, a Sum-Addressed-Compare mechanism is used which, as discussed earlier, enables the virtual address comparison to be performed in a very efficient manner. In particular, the virtual address will normally be computed by adding together two source values, and the Sum-Addressed-Compare mechanism allows a determination to be made as to whether the result of summing those two values will match the relevant part of the virtual address within an entry of the address translation cache without full carry propagation being required.

In particular, for each TLB entry, a check needs to be made as to whether the stored virtual_address (K) is the same as the calculated virtual address (A+B) (where A and B are the two source values added together to form the virtual address). This would normally be done by generating VA=A+B, and comparing VA==K. This, however, is slow, depending on the full carry propagation of the adder. Instead, in accordance with the Sum-Addressed-Compare technique, it is assumed that the calculated VA is the same as the stored TLB_VA (K). If that is the case, then for each bit i:

$A_i \wedge B_i \wedge CIN_i == K_i$ [where ^ indicates an XOR operation]

Since $A_i$, $B_i$, and $K_i$ are known out of a flop, we can determine the required carry in $CIN_i$ for each bit:

$CIN_i\_required = K_i \wedge A_i \wedge B_i$

If the carry_in for any bit does not match the above CINi_required, that TLB entry does not match.

Similarly, it can be determined that if the entry matches, the carry out of each bit must be:

$COUT_i\_required = (A_i \& B_i) | (CIN_i\_required \& (A_i | B_i))$ [where & indicates an AND operation and indicates an OR operation]

$COUT_i\_required = (A_i \& B_i) | ((K_i \wedge A_i \wedge B_i) \& (A_i | B_i))$ $COUT_i\_required = (A_i \& B_i) | ((A_i \wedge B_i) \& \sim K_i)$ Using normal Generate/propagate terminology where:

$P_i = A_i \wedge B_i$; (determines whether bit i will propagate a carry-in to carry-out)

$G_i = A_i \& B_i$; (determines whether bit i will generate a carry-out of 1)

the above can be rewritten as:

$CIN_i\_required = K_i \wedge P_i$;

$COUT_i\_required = G_i | (P_i \& \sim K_i)$;

It is hence known what the carry-in and carry-out of each bit must be if the comparison is to be correct. All that is needed is to compare the carry-in of one bit with the carry-out of the bit below it to see if there is a match.

When using such an approach, the hit vectors for the smaller page sizes will be produced earlier than the hit vectors for the larger pages sizes, as illustrated schematically in FIG. 7, where the hit vectors are output over the paths 352, 354, 356, 358, 360 and 362.

In the example embodiment, it is also assumed that coalescing is restricted to certain pages sizes. In particular, in one embodiment four adjacent 4 KB virtual pages which are mapped to adjacent 4 KB physical pages can be coalesced into one 16 KB page. Similarly, four adjacent 16 KB virtual pages which are mapped to adjacent 16 KB physical pages can be coalesced into one 64 KB page, and four adjacent 64 KB virtual pages which are mapped to adjacent 64 KB physical pages can be coalesced into one 256 KB page. However, in the described embodiment it is assumed that coalescing may not be performed in respect of any other page sizes, and only one level of coalescing is allowable, i.e. coalesced addressed translation data cannot itself be coalesced further into a larger page.

In accordance with such an embodiment, the access control circuitry 180 can be arranged to determine a coalesced multi-hit indication using the hit vectors 354, 356, 358 for page sizes that can be associated with coalesced address translation data, and the hit vector 352 relating to the smaller page size that cannot itself be associated with coalesced address translation data, but which can relate to non-coalesced address translation data that can be the subject of coalescing.

The generation of the coalesced multi-hit indication involves performance of the operations 370, 375, 380, 382 and 384 shown in FIG. 7. In particular, a coalesced hit vector generation step 370 is performed that uses as inputs the three hit vectors 354, 356, 358, and the coalesced entry vector 372 which, as discussed earlier with reference to FIG. 5, can be obtained from the coalesced entry flag field 225 associated with each of the entries in the TLB. In particular, the coalesced hit vector generator 370 can be arranged to perform the following logical computation:

```
coalesced_hit_vector[TLB_SIZE-1:0] =
( 16KB_hit_vector[TLB_SIZE-1:0]
| 64KB_hit_vector[TLB_SIZE-1:0]
| 256KB_hit_vector[TLB_SIZE-1:0]
) & coalesced_entry[TLB_SIZE-1:0].
```

Hence, the operation performs a logical ORing of the three hit vectors in order to produce an intermediate vector, which is then logically ANDed with the coalesced entry vector. Hence, it will be appreciated that the coalesced hit vector will identify when a coalesced entry relating to either a 16 KB, 64 KB or 256 KB page size has resulted in a hit during the lookup operation.

Similarly, a non-coalesced hit vector generation operation 375 can be performed, again using the three hit vectors 354, 356, 358, but also using the hit vector 352 associated with the 4 KB page size. Furthermore, the non-coalesced hit vector generation operation 375 is provided with an inverted version of the coalesced entry vector over path 377. In one embodiment, the non-coalesced hit vector generation operation performs the following logical computation:

```
non_coalesced_hit_vector[TLB_SIZE-1:0]=
( ( 16KB_hit_vector[TLB_SIZE-1:0]
| 64KB_hit_vector[TLB_SIZE-1:0]
| 256KB_hit_vector[TLB_SIZE-1:0]
) & ~coalesced_entry[TLB_SIZE-1:0]
) | 4KB_hit_vector[TLB_SIZE-1:0].
```

Hence, the three hit vectors associated with the page sizes that could be associated with coalesced address translation data are logically ORed together to produce an intermediate result, which in this case is then ANDed with the inverted version of the coalesced entry vector, thereby identifying a situation where one of the entries associated with a 16 KB page size, 64 KB page size or 256 KB page size has resulted in a hit being detected for non-coalesced address translation data. This output is then logically ORed with the hit vector 352 for the 4 KB page size to produce the non-coalesced hit vector. In this way, the non-coalesced hit vector will identify when there has been a hit in a non-coalesced entry for either a 4 KB, 16 KB, 64 KB or 256 KB page size.

As shown by steps 380, 382, both the coalesced hit vector and the non-coalesced hit vector are subjected to an OR reduce operation in order to reduce the vectors into a single bit value. In the illustrated embodiment, these single bit values will be set high if any bit in the vector is set high. The outputs from the two OR reduce steps 380, 382 are then logically ANDed at step 384 to produce the coalesced multi-hit signal. As a result, it can be seen that steps 380, 382 and 384 collectively perform the following logical computation:

coalesced multi hit=|coalesced_hit_vector[TLB_SIZE-1:0] &|non_coalesced_hit_vector[TLB_SIZE-1:0]. [where | indicates an OR reduce]

As a result, it will be appreciated that the above described mechanism provides a precise way of detecting duplicate entries due to hardware coalescing, enabling a clear demarcation of hardware coalescing induced multi-hits from software induced multi-hits due to badly mapped translations consisting of overlapping pages. Further, as shown in FIG. 7, this process can be initiated without waiting for the hit vectors to be output during the lookup operation for the larger page sizes, in this case the hit vectors 360, 362 associated with the 2 MB and 512 MB page sizes.

Once the lookup operation 350 has been completed, then a multi-hit detection step 390 can be performed to determine if there are multiple hits. This process can be performed by logically ORing all of the hit vectors 352, 354, 356, 358, 360 and 362 together and detecting situations where the result contains more than one bit set.

If the output of the multi-hit detection step indicates that in fact there have been no hits, then a miss request can be issued to the MMU in order to retrieve the required address translation data. This step is not shown in FIG. 7. However, assuming the result vector output by the multi-hit detection step 390 has at least one bit set, it is then determined at step 392 whether there is only a single hit. If there is, then that hit can be processed in the usual way, in order to retrieve the address translation data from the hit entry, and return that information as a translation response to the core 10.

However, if it is determined that there is a multi-hit situation, then a coalesced multi-hit analysis operation 395 can be performed, where the multi-hit from the multi-hit detection stage 390 is qualified by the coalesced multi-hit indication. In particular, if the coalesced multi-hit indication is not set, then this indicates that the multi-hit is due to a software induced issue, and in this instance a TLB conflict abort signal is issued in one embodiment to flag this situation.

However, if the coalesced multi-hit signal is set, this indicates that the multi-hit is due to hardware coalescing. In this instance, in one embodiment a cleanup operation is then initiated within the TLB, and in parallel a retry request is issued to the core. The cleanup operation is used to update the TLB contents to remove the duplicate entries, so that by the time the cleanup operation is finished, only the coalesced entry is present, and the non-coalesced entry that gave rise to the multi-hit before has been invalidated. It has been found that this cleanup operation can be performed in sufficient time that by the time the core retries the request, the cleanup has been completed, and hence when the request is retried only a single hit will be detected. In one particular example arrangement, there is a five cycle delay in the core retrying the request, and the cleanup operation can be completed within these five cycles, hence incurring a turnaround latency of only five cycles, making this approach a performant solution.

Figure 8:
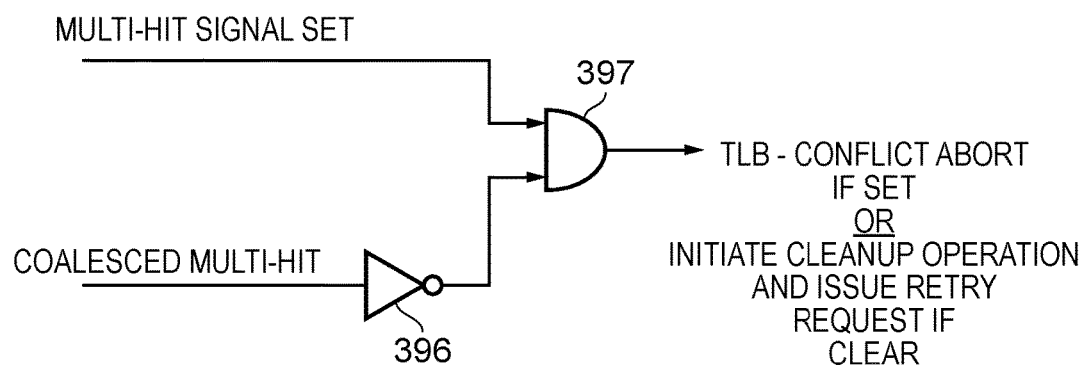
FIG. 8 schematically illustrates how the coalesced multi-hit indication may be used to qualify the multi-hit signal in one embodiment, to distinguish between software-induced multiple hits and hardware-induced multiple hits arising from the use of coalesced address translation data.

FIG. 8 is a diagram illustrating how the coalesced multi-hit indication can be used to qualify the multi-hit signal from the multi-hit detection operation 390 in one embodiment. In particular, the multi-hit signal is set when multiple bits in the output of the multi-hit detection stage are set, this multi-hit signal being provided to the AND gate 397. An inverted version of the coalesced multi-hit signal (inverted by the inverter 396) is then provided as the other input to the AND gate. Accordingly, it will be appreciated that if the AND gate outputs a logic one value, this can be used to assert the TLB-conflict abort, since in that case the coalesced multi-hit indication would be at a logic 0 value, indicating that the multiple hits were not due to hardware coalescing. Conversely, if the coalesced multi-hit indication is set high, indicating that the multiple hits are due to hardware coalescing, the output from the AND gate will be at a logic 0 value, and this can be used to initiate a cleanup operation, and to issue the retry request to the core.

Figure 9A:
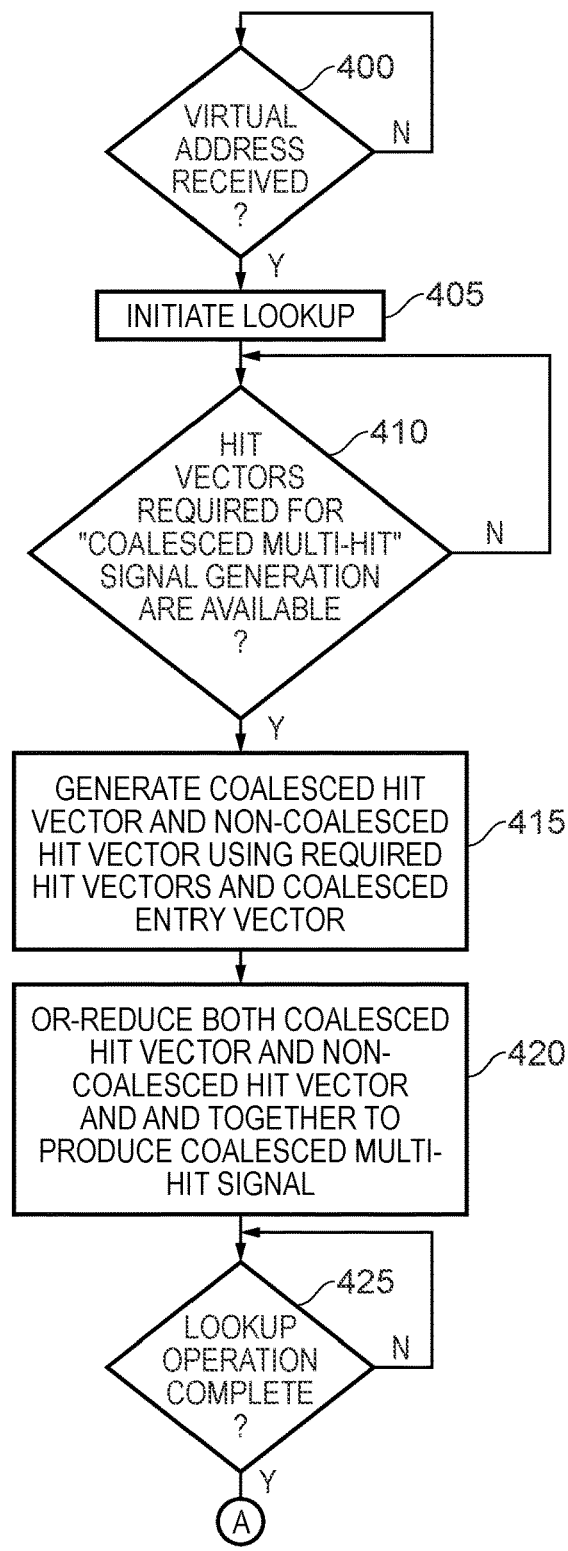
FIGS. 9A and 9B are flow diagrams illustrating the steps performed in relation to the level 1 TLB upon receipt of a virtual address from the processor core, in accordance with one embodiment.
Figure 9B:
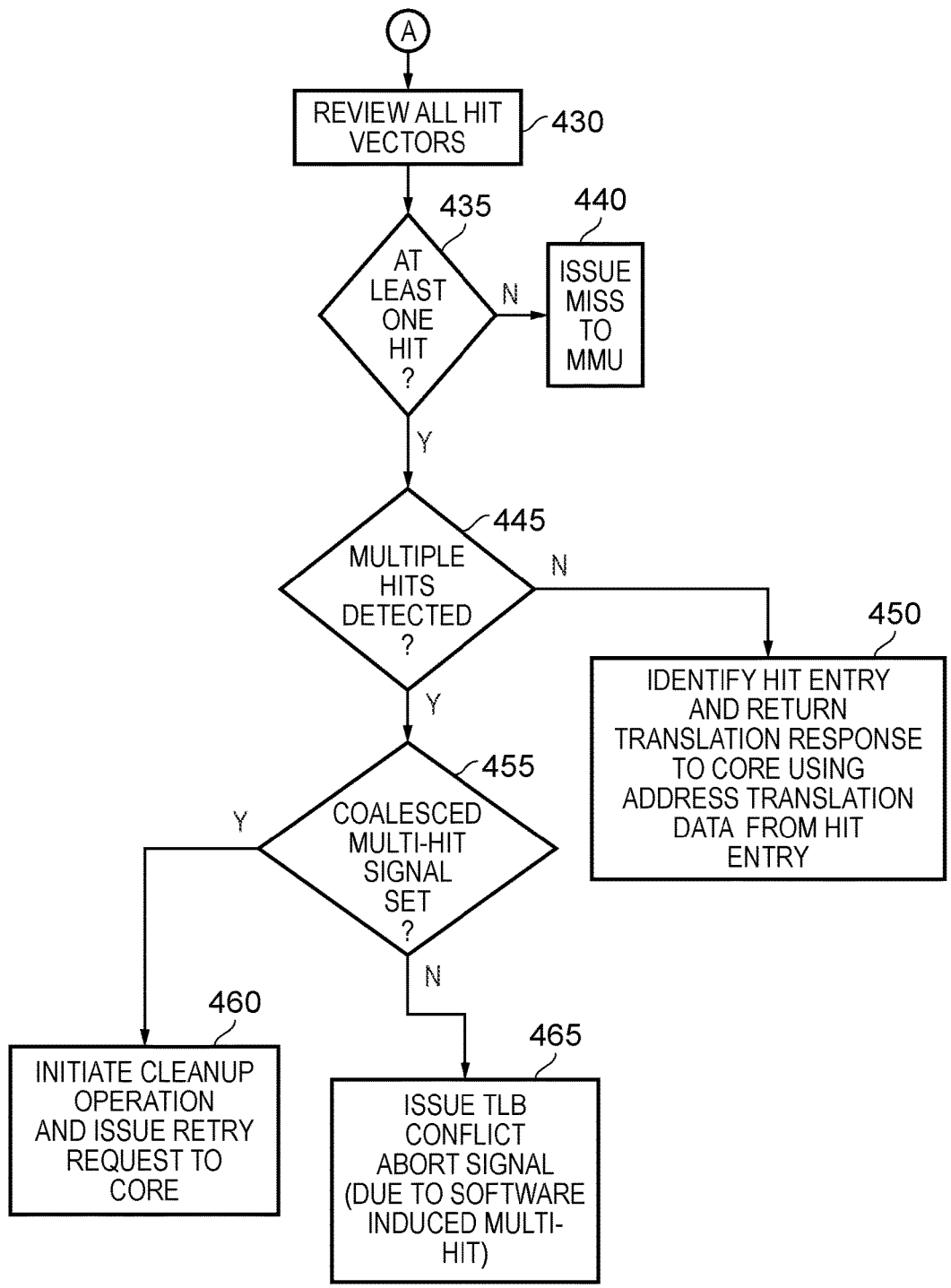

FIGS. 9A and 9B are a flow diagram illustrating for completeness the sequence of events performed by the access control circuitry 180 of FIG. 4 upon receipt of a new virtual address from the core. At step 400, a new virtual address is awaited, and when the new virtual address is received from the core, a lookup operation is initiated at step 405. As will be apparent from the earlier discussion of FIG. 7, the lookup operation takes a period of time to complete, with the hit vectors for particular page sizes being produced at different times.

At step 410, it is determined whether the hit vectors required for the coalesced multi-hit signal generation are available. Once those hit vectors are available, then at step 415 a coalesced hit vector and a non-coalesced hit vector are generated using the required hit vectors and the coalesced entry vector. This can be performed using the earlier described operations 370, 375 of FIG. 7, for example.

At step 420, an OR-reduce operation is performed in respect of both the coalesced hit vector and the non-coalesced hit vector, with those outputs being logically ANDed together to produce the coalesced multi-hit signal. This can be performed by the operations 380, 382, 384 shown in FIG. 7, for example.

At step 425, it is determined whether the lookup operation is complete, and once the lookup operation is complete then at step 430 all of the hit vectors are reviewed, for example by performing a logical ORing of those hit vectors together using the multi-hit detection operation 390 discussed earlier with reference to FIG. 7.

Thereafter, at step 435 it is determined whether there is at least one hit. If there is no hit then a miss request can be issued to the MMU at step 440 in order to cause the required address translation data to be retrieved. Typically once that address translation data is returned from the MMU, it is used to provide the translation response to the core, and also to allocate new address translation data into the TLB 30. By allocating the address translation data at this point, it is then ensured that if a subsequent virtual address relating to the same page is issued by the core, a hit will be detected in the TLB 30.

If it is determined at step 435 that there is at least one hit, it is then determined at step 445 whether there are in fact multiple hits. If not, then the process proceeds to step 450 where the hit entry is identified, and a translation response is returned to the core using the address translation data from the hit entry.

If at step 445 multiple hits are detected, then at step 445 it is determined whether the coalesced multi-hit signal is set. If so, this indicates a hardware induced multi-hit situation, and accordingly the process proceeds to step 460 where a cleanup operation is initiated in respect of the TLB, and a retry request is issued to the core.

However, if the coalesced multi-hit signal is not set, then the process proceeds to step 465 where a TLB conflict abort signal is issued to flag that a software induced multi-hit condition has occurred.

Figure 10:
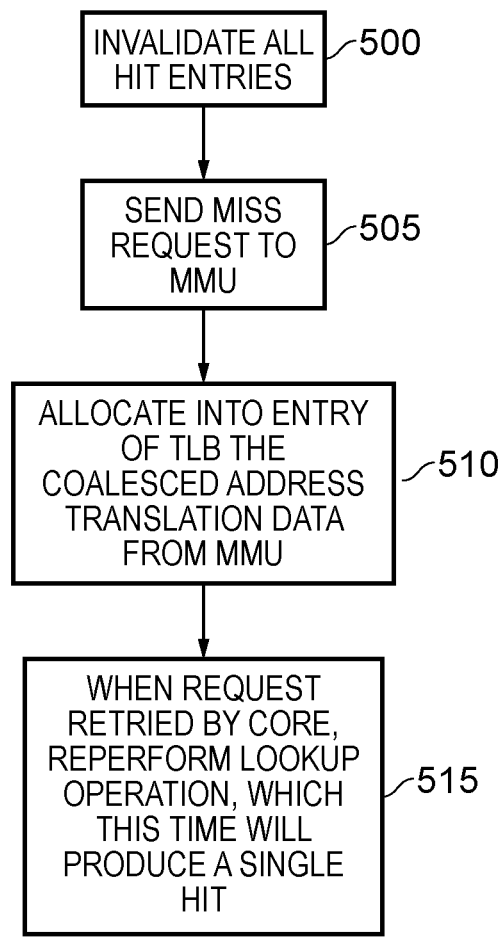
FIG. 10 is a flow diagram illustrating the clean up and retry functionality that may be employed in accordance with one embodiment.

In one embodiment, the cleanup operation may involve identifying which one of the multiple entries that hit contains non-coalesced address translation data, and then invalidating that entry. However, in another embodiment it has been found to be simpler to merely invalidate all of the hit entries and to issue a miss request to the MMU, and it has been found that this does not incur any time penalty as the MMU response can be obtained and the TLB repopulated, prior to the retry request being received from the core. This process is shown in FIG. 10. At step 500, all of the hit entries are invalidated, and then at step 505 a miss request is issued to the MMU. The miss request will then cause the MMU to obtain the coalesced address translation data (typically this can merely be retrieved from the level 2 TLB 190), and then that coalesced address translation data can be returned to the access control circuitry 180 to allow it to be allocated into the level 1 TLB 30.

Accordingly, at step 510 the coalesced address translation data from the MMU will be allocated into a victim entry of the TLB. Thereafter, at step 515, when the request is retried by the core, the lookup operation is performed, and this time will produce a single hit, resulting in the required translation response being returned to the core.

It will be appreciated that the described embodiments provide a precise and efficient mechanism for detecting duplicate entries in a TLB due to hardware coalescing, enabling clear demarcating of hardware coalescing induced multiple hits from software induced multiple hits. In particular, any multiple hit resulting from two or more non-coalesced pages will not cause the coalesced multi-hit hit indication to be set. Similarly, any multi-hit between two coalesced entries will also not cause the coalesced multi-hit indication to be set, and hence will be interpreted as a software induced multiple hit. This is the correct behaviour since the MMU of the described embodiment does not use a coalesced entry to coalesce further, and hence there should never be multiple hits between two coalesced entries due to the hardware coalescing technique employed. It should also be noted that in the particular example discussed, where the MMU coalesces only up to a 256 KB page size, any multiple hit of a coalesced entry with a 512 MB or 2 MB page should always be treated as a software induced multiple hit. This occurs automatically in the implementation discussed in the embodiments, since the hit vectors for the 2 MB and 512 MB page sizes are excluded from the operations used to generate the coalesced multi-hit indication. Hence, the coalesced multi-hit indication will not be set when there is a hit in both a coalesced entry and an entry associated with one of the two larger page sizes, and whilst that multiple hit will then be detected by the multi-hit detection stage 390 after the lookup operation is completed, this will cause the triggering of a TLB conflict abort due to the coalesced multi-hit indication being clear, hence triggering the desired behaviour.

In the described embodiments, a multi-hit signal produced after the lookup operation has finished, when this indicates the presence of multiple hits, may be qualified with the NOT of the coalesced multi-hit indication to generate a TLB conflict abort to handle the case of software induced multiple hits. It has been found that there is sufficient time to generate the coalesced multi-hit indication during the TLB lookup operation, hence making this a non-timing critical implementation. Also, as a result, if it is determined that the multiple hit situation is due to hardware coalescing, the generation of any hit back to the core can be suppressed in time in the cycle after the lookup operation in order to reject the operation and cause the core to subsequently reissue that request, while simultaneously a miss request can be issued to the MMU. It has been found that, by the time the core is ready to reissue the request, an MMU response can be made available to the level 1 TLB due to a hit being detected in the MMU's TLB, hence allowing the TLB to be updated so as to avoid a multiple hit being detected when the request is retried.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
an address translation cache having a plurality of entries, each entry to store address translation data used when converting a virtual address into a corresponding physical address of a memory system, each entry being arranged to identify whether the address translation data stored therein is coalesced address translation data or non-coalesced address translation data and to identify a page size for a page within the memory system that is associated with the address translation data; and
control circuitry responsive to a virtual address, to perform a lookup operation within the address translation cache to produce, for each page size supported by the address translation cache, a hit indication to indicate whether a hit has been detected for an entry storing address translation data of the associated page size;
the control circuitry being arranged to determine, from at least each hit indication for a page size that is able to be associated with coalesced address translation data, a coalesced multi-hit indication which is set when a hit is detected for both an entry containing coalesced address translation data and for an entry containing non-coalesced address translation data;
the control circuitry further being arranged to determine, when the lookup operation has completed, whether multiple hits have been detected, and in that instance to reference the coalesced multi-hit indication to determine whether the multiple hits have resulted from both coalesced address translation data and non-coalesced address translation data in the address translation cache.

2. An apparatus as claimed in claim 1, wherein:
the page sizes supported by the address translation cache include one or more page sizes unable to be associated with coalesced address translation data; and
the control circuitry is arranged to determine the coalesced multi-hit indication from a subset of the hit indications without awaiting generation during the lookup operation of at least one remaining hit indication outside said subset, each remaining hit indication relating to a page size unable to be associated with coalesced address translation data.

3. An apparatus as claimed in claim 2, wherein said subset of hit indications comprises each hit indication for a page size that is able to be associated with coalesced address translation data, and at least one hit indication for a page size smaller than any page size that is able to be associated with coalesced address translation data.

4. An apparatus as claimed in claim 2, wherein said remaining hit indications relate to page sizes larger than any page size that is able to be associated with coalesced address translation data.

5. An apparatus as claimed in claim 1, wherein the control circuitry comprises Sum-Addressed-Compare circuitry to perform the lookup operation, such that each hit indication becomes available at a timing that is dependent on the page size associated with that hit indication.

6. An apparatus as claimed in claim 1, wherein each hit indication comprises a hit vector identifying on an entry by entry basis whether a hit has been detected for address translation data of the associated page size.

7. An apparatus as claimed in claim 6, wherein the control circuitry is arranged to determine the coalesced multi-hit indication by:
generating a coalesced hit vector by logically combining the hit vectors of each hit indication for a page size that is able to be associated with coalesced address translation data, qualified by information identifying which entries contain coalesced address translation data;
generating a non-coalesced hit vector by logically combining the hit vectors of each hit indication for a page size that is able to be associated with coalesced address translation data, qualified by information identifying which entries contain non-coalesced address translation data, in order to produce an output vector from which the non-coalesced hit vector is derived; and performing a reduction and combining operation on the coalesced hit vector and non-coalesced hit vector to generate the coalesced multi-hit indication.

8. An apparatus as claimed in claim 7, wherein the control circuitry is arranged to generate said non-coalesced hit vector by logically combining the output vector with the hit vector of at least one hit indication associated with a page size smaller than any page size that is able to be associated with coalesced address translation data.

9. An apparatus as claimed in claim 7, wherein:
said information identifying which entries contain coalesced address translation data comprises a coalesced entry vector identifying on an entry by entry basis whether that entry stores coalesced address translation data.

10. An apparatus as claimed in claim 9, wherein:
the control circuitry is arranged to generate the coalesced hit vector by performing an OR operation using as inputs the hit vectors of each hit indication for a page size that is able to be associated with coalesced address translation data, in order to produce a partial result vector, and then performing an AND operation using as inputs the partial result vector and the coalesced entry vector, in order to produce the coalesced hit vector.

11. An apparatus as claimed in claim 9, wherein:
the control circuitry is arranged to generate the non-coalesced hit vector by performing an OR operation using as inputs the hit vectors of each hit indication for a page size that is able to be associated with coalesced address translation data, in order to produce a partial result vector, and then performing an AND operation using as inputs the partial result vector and an inverted version of the coalesced entry vector, in order to produce the output vector from which the non-coalesced hit vector is derived.

12. An apparatus as claimed in claim 7, wherein the control circuitry is arranged to perform the reduction and combining operation by OR-reducing the coalesced hit vector to produce a first intermediate result, OR-reducing the non-coalesced hit vector to produce a second intermediate result, and then performing an AND operation using as inputs the first and second intermediate results, in order to generate the coalesced multi-hit indication.

13. An apparatus as claimed in claim 1, wherein the control circuitry is arranged, when it is determined that multiple hits have been detected by the lookup operation and the coalesced multi-hit indication is unset, to issue a signal indicating that a software induced multi-hit event has occurred.

14. An apparatus as claimed in claim 1, wherein the control circuitry is arranged, when it is determined that multiple hits have been detected by the lookup operation and the coalesced multi-hit indication is set, to issue a retry request to a source that provided the virtual address, and to initiate a cleanup operation to invalidate at least one entry in the address translation cache, such that when the source reissues the virtual address, a hit will then be detected in only one entry of the address translation cache.

15. An apparatus as claimed in claim 14, wherein the cleanup operation causes invalidation of at least an entry storing non-coalesced address translation data that resulted in a hit during the lookup operation.

16. An apparatus as claimed in claim 14, wherein the cleanup operation comprises invalidation of each entry that resulted in a hit during the lookup operation, and issuance of a request to a memory management unit to cause coalesced address translation data to be provided for allocating into an entry of the address translation cache.

17. An apparatus as claimed in claim 1, further comprising:
coalescing circuitry to generate, for storage in the address translation cache, said coalesced address translation data from multiple page table descriptors, the coalesced address translation data relating to a page size which is a multiple of the page size associated with each of the page table descriptors and which is one of the pages sizes supported by the address translation cache.

18. An apparatus as claimed in claim 1, wherein said address translation cache is a translation lookaside buffer (TLB) used to store full address translation data to enable a virtual address to be converted into a corresponding physical address.

19. An apparatus as claimed in claim 1, wherein said address translation cache is a fully associative cache.

20. A method of managing address translation data within an address translation cache having a plurality of entries, each entry storing address translation data used when converting a virtual address into a corresponding physical address of a memory system, and each entry identifying whether the address translation data stored therein is coalesced address translation data or non-coalesced address translation data and identifying a page size for a page within the memory system that is associated with the address translation data, the method comprising:
performing a lookup operation within the address translation cache, in response to a virtual address, to produce, for each page size supported by the address translation cache, a hit indication to indicate whether a hit has been detected for an entry storing address translation data of the associated page size;
determining, from at least each hit indication for a page size that is able to be associated with coalesced address translation data, a coalesced multi-hit indication which is set when a hit is detected for both an entry containing coalesced address translation data and for an entry containing non-coalesced address translation data; and
determining, when the lookup operation has completed, whether multiple hits have been detected, and in that instance referencing the coalesced multi-hit indication to determine whether the multiple hits have resulted from both coalesced address translation data and non-coalesced address translation data in the address translation cache.

* * * * *